US011913592B2

(12) United States Patent
Parrella et al.

(10) Patent No.: US 11,913,592 B2
(45) Date of Patent: Feb. 27, 2024

(54) THERMALLY INSULATING PIPES

(71) Applicant: EXOTEX, INC., Westport, CT (US)

(72) Inventors: Michael J. Parrella, Weston, CT (US); Bart A. Siegel, Greenback, TN (US); Nevil R. Ede, Westport, CT (US)

(73) Assignee: EXOTEX, INC., Houston, TX (US)

( * ) Notice: Subject to any disclaimer, the term of this patent is extended or adjusted under 35 U.S.C. 154(b) by 0 days.

(21) Appl. No.: 15/761,514

(22) PCT Filed: Sep. 21, 2016

(86) PCT No.: PCT/US2016/052822
§ 371 (c)(1),
(2) Date: Mar. 20, 2018

(87) PCT Pub. No.: WO2017/053388
PCT Pub. Date: Mar. 30, 2017

(65) Prior Publication Data
US 2018/0259115 A1    Sep. 13, 2018

Related U.S. Application Data

(60) Provisional application No. 62/221,438, filed on Sep. 21, 2015.

(51) Int. Cl.
*F16L 59/14* (2006.01)
*F16L 59/147* (2006.01)
(Continued)

(52) U.S. Cl.
CPC .......... *F16L 59/147* (2013.01); *B29D 23/001* (2013.01); *F16L 9/14* (2013.01); *F16L 59/028* (2013.01); *B29C 63/06* (2013.01)

(58) Field of Classification Search
CPC ......... F16L 59/147; F16L 59/028; F16L 9/14; B29D 23/001; B29C 63/06
See application file for complete search history.

(56) References Cited

U.S. PATENT DOCUMENTS 2,021,378 A    11/1935 Prosser
2,170,207 A    8/1939 Mosier et al.
(Continued)

FOREIGN PATENT DOCUMENTS

CN    101642681    2/2010
CN    201482323    5/2010
(Continued)

OTHER PUBLICATIONS

Machine Translation of German Patent 3516628, Date Unknown.*
(Continued)

*Primary Examiner* — Jeffry H Aftergut
(74) *Attorney, Agent, or Firm* — Ware, Fressola, Maguire & Barber LLP

(57) ABSTRACT

Thermally insulating pipes are provided for use in the transportation of a heated substance, such as steam or a fluid. The thermally insulating pipes allow the substance traveling through the pipes to retain their heat during transport. The thermally insulating pipes may include one or more layers each of pipe and insulating material, which are overlapping and alternating in the thermally insulating pipe. An outer pipe layer is also provided on the thermally insulating pipe, which may have an increased thickness for threading, splicing or swedging the thermally insulating pipe.

16 Claims, 7 Drawing Sheets

(51) Int. Cl.
  *F16L 9/14* (2006.01)
  *B29D 23/00* (2006.01)
  *F16L 59/02* (2006.01)
  *B29C 63/06* (2006.01)

(56) References Cited

U.S. PATENT DOCUMENTS

| | | | |
|---|---|---|---|
| 2,981,332 A | 4/1961 | Miller et al. | |
| 3,053,715 A * | 9/1962 | Labino | C04B 30/02 |
| | | | 138/141 |
| 3,219,472 A | 11/1965 | Hucks, Jr. | |
| 3,240,643 A * | 3/1966 | Schroeder et al. | F16L 59/153 |
| | | | 156/143 |
| 3,314,450 A | 4/1967 | Doering et al. | |
| 3,489,626 A | 1/1970 | Rubenstein | |
| 3,581,778 A | 6/1971 | Korejwa et al. | |
| 3,650,864 A | 3/1972 | Goldsworthy | |
| 3,728,187 A * | 4/1973 | Martin | B29C 53/66 |
| | | | 156/162 |
| 3,742,985 A | 7/1973 | Rubenstein | |
| 3,808,087 A | 4/1974 | Milewski et al. | |
| 3,879,243 A | 4/1975 | Medney | |
| 3,917,530 A | 11/1975 | Boske | |
| 4,026,747 A * | 5/1977 | DeLorean | F16L 9/16 |
| | | | 156/171 |
| 4,217,158 A | 8/1980 | Puck | |
| 4,235,561 A | 11/1980 | Peterson | |
| 4,415,613 A | 11/1983 | Medney | |
| 4,654,407 A | 3/1987 | Domeier | |
| 4,691,450 A | 9/1987 | Glaser et al. | |
| 4,695,344 A | 9/1987 | Crane et al. | |
| 4,943,472 A | 7/1990 | Dyksterhouse et al. | |
| 5,260,121 A | 11/1993 | Gardner et al. | |
| 5,549,947 A | 8/1996 | Quigley et al. | |
| 5,799,705 A | 9/1998 | Friedrich et al. | |
| 6,006,829 A | 12/1999 | Whitlock et al. | |
| 6,053,213 A * | 4/2000 | Jung | F16L 11/083 |
| | | | 138/131 |
| 6,139,942 A * | 10/2000 | Hartness | B29B 15/105 |
| | | | 428/297.4 |
| 6,302,621 B1 | 10/2001 | Miya et al. | |
| 6,352,108 B1 | 3/2002 | Meyer et al. | |
| 6,461,554 B2 | 10/2002 | Dewimille et al. | |
| 6,763,853 B1 | 7/2004 | Redding et al. | |
| 6,782,932 B1 * | 8/2004 | Reynolds, Jr. | B29C 53/70 |
| | | | 156/360 |
| 8,210,212 B2 | 7/2012 | Buchner | |
| 2002/0040898 A1 | 4/2002 | Von Arx et al. | |
| 2003/0119398 A1 | 6/2003 | Bogdanovich et al. | |
| 2004/0157519 A1 | 8/2004 | Goodell et al. | |
| 2004/0169308 A1 * | 9/2004 | Walker | A61M 25/0009 |
| | | | 264/209.3 |
| 2005/0023002 A1 | 2/2005 | Zamora et al. | |
| 2006/0162906 A1 | 7/2006 | Hong et al. | |
| 2006/0207673 A1 | 9/2006 | O'Brien et al. | |
| 2007/0107791 A1 | 5/2007 | Rice et al. | |
| 2007/0108112 A1 | 5/2007 | Jones et al. | |
| 2007/0281092 A1 | 12/2007 | Fredrickson et al. | |
| 2008/0093123 A1 | 4/2008 | Pinto Bascompte | |
| 2009/0004453 A1 | 1/2009 | Murai et al. | |
| 2009/0044936 A1 | 2/2009 | Schulz | |
| 2009/0107558 A1 | 4/2009 | Quigley et al. | |
| 2009/0159146 A1 * | 6/2009 | Jackson | B29C 45/14336 |
| | | | 138/146 |
| 2009/0208684 A1 | 8/2009 | Dunleavy et al. | |
| 2010/0154917 A1 * | 6/2010 | Batallas | F16L 59/029 |
| | | | 138/141 |
| 2010/0178842 A1 | 7/2010 | Thompson | |
| 2010/0243547 A1 | 9/2010 | Justice | |
| 2010/0263761 A1 | 10/2010 | Niccolls et al. | |
| 2010/0271253 A1 | 10/2010 | Shah et al. | |
| 2011/0272082 A1 | 11/2011 | Dunleavy et al. | |
| 2012/0155813 A1 * | 6/2012 | Quigley | F16L 9/19 |
| | | | 385/101 |
| 2013/0081347 A1 | 4/2013 | Dewar et al. | |
| 2013/0209836 A1 | 8/2013 | Hucker et al. | |
| 2014/0072740 A1 * | 3/2014 | Zaiser | B29C 53/66 |
| | | | 118/325 |
| 2014/0113104 A1 | 4/2014 | Rozant et al. | |
| 2014/0154437 A1 * | 6/2014 | Schroeder | F27B 14/10 |
| | | | 428/34.1 |
| 2014/0179187 A1 | 6/2014 | Restuccia et al. | |
| 2014/0265311 A1 | 9/2014 | Taylor | |
| 2015/0047769 A1 | 2/2015 | Quinn et al. | |
| 2015/0068633 A1 | 3/2015 | Lazzara et al. | |
| 2015/0099078 A1 | 4/2015 | Fish | |
| 2017/0167119 A1 | 6/2017 | Stone | |
| 2017/0341978 A1 * | 11/2017 | Zaiser | B29C 70/32 |
| 2018/0044849 A1 | 2/2018 | Parrella et al. | |
| 2018/0045341 A1 * | 2/2018 | Parrella | D06M 15/55 |
| 2018/0141310 A1 | 5/2018 | Coumans | |
| 2018/0200714 A1 | 7/2018 | Viovy et al. | |

FOREIGN PATENT DOCUMENTS

| | | | |
|---|---|---|---|
| DE | 3516628 A1 * | 11/1986 | |
| EP | 0216518 | 4/1987 | |
| WO | 2010039358 | 4/2010 | |
| WO | WO-2010/096935 A1 * | 9/2010 | |
| WO | 2014066386 | 5/2014 | |

OTHER PUBLICATIONS

USPTO Office Action for U.S. Appl. No. 15/552,868 dated Dec. 13, 2019.
"Aviation Maintenance Technician Handbook—Airframe", U.S. Department of Transportation & Federal Aviation Administration, vol. 1, 2012, 79 pages.
"The matrix" www.compositesworld.com/articles/the-matrix, Jan. 1, 2014, 7 pages.
A. Adumitroaie et al., "Beyond Plain Weave Fabrics—I. Geometrical Model", 2011, 20 pages.
International Search Report and Written Opinion, PCT/US2016/019077, dated May 12, 2016.
International Search Report and Written Opinion, PCT/US2016/019068, dated Jun. 3, 2016.
USPTO Office Action, U.S. Appl. No. 15/552,868 dated Jan. 13, 2022 (13 pages).
USPTO Office Action, U.S. Appl. No. 15/552,868 dated Oct. 15, 2020 (11 pages).
USPTO Office Action, U.S. Appl. No. 15/552,871, filed Feb. 9, 2022 (12 pages).
International Search Report and Written Opinion, PCT/US19/66913, dated Jun. 15, 2020 (13 pages).
1 USPTO Office Action, U.S. Appl. No. 15/552,868, filed Aug. 16, 2022 (12 pages).

* cited by examiner

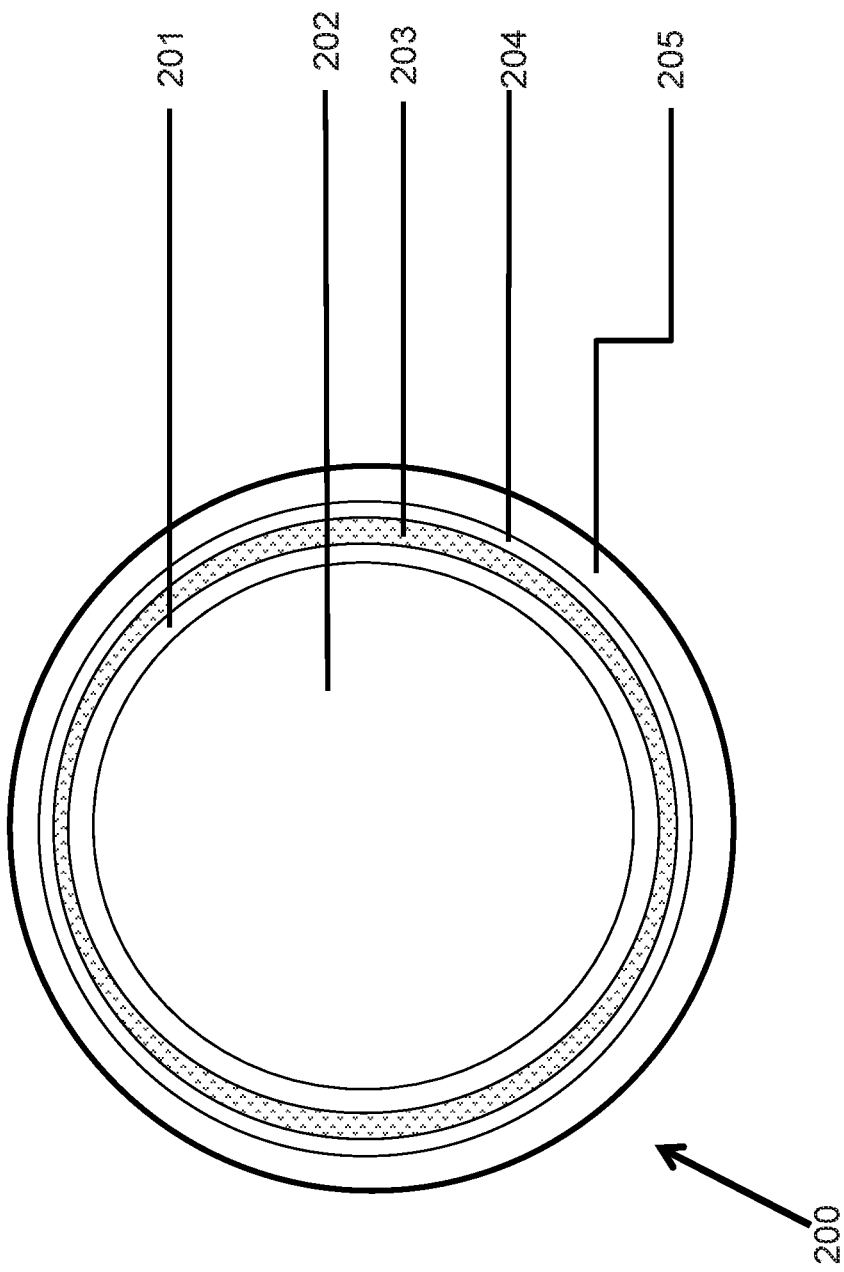

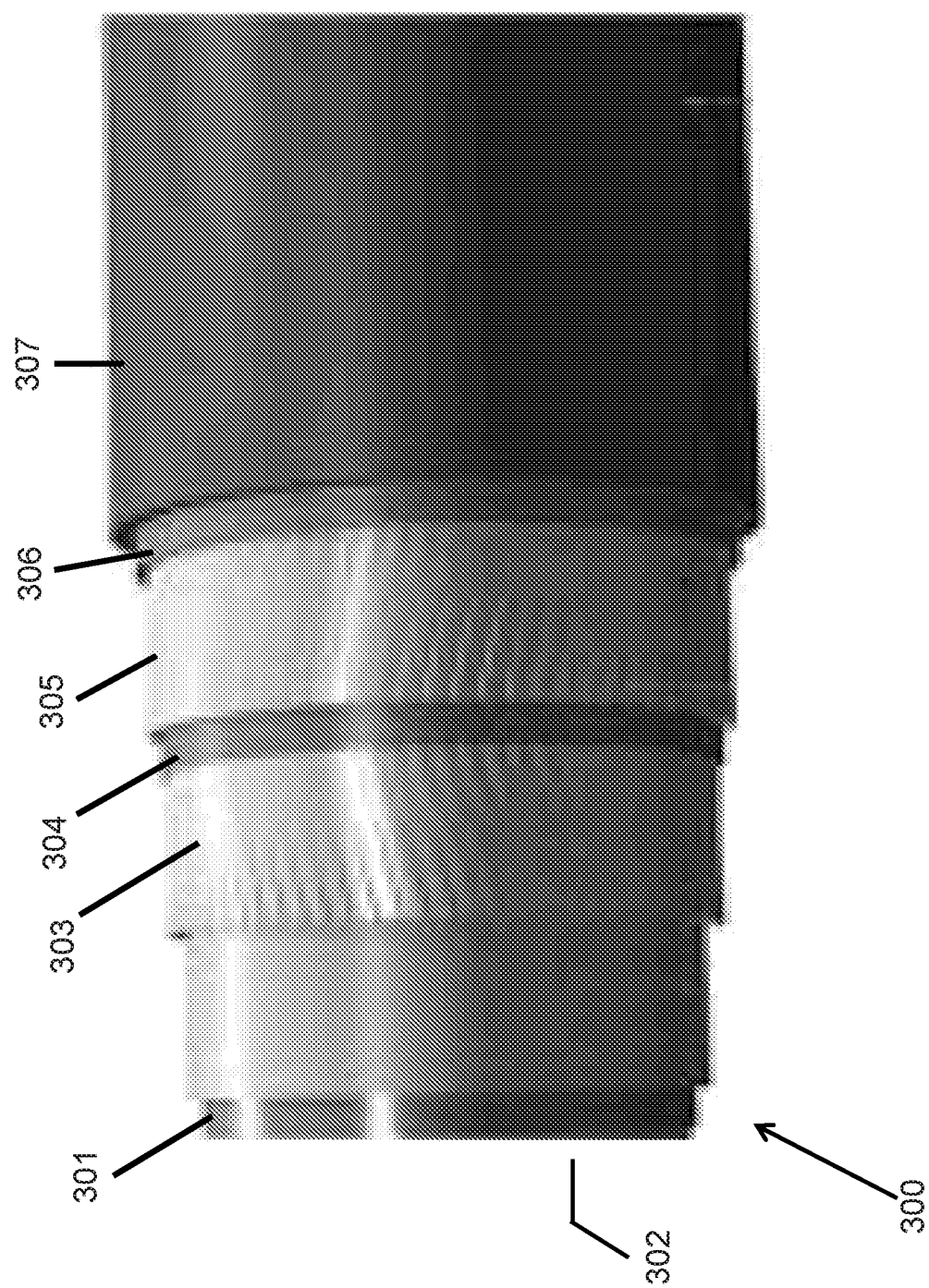

THERMALLY INSULATING PIPES

CROSS-REFERENCE TO RELATED APPLICATIONS

The present application claims the benefit of U.S. Provisional Application Ser. No. 62/221,438, filed on Sep. 21, 2015, which is incorporated by reference in its entirety.

BACKGROUND OF THE INVENTION

Steam injection, water flooding and several other enhanced oil recovery ("EOR") methods are used in order to increase the amount of oil that can be recovered from an oil reservoir. The EOR methods each have several advantages and disadvantages. This makes it critical to choose the right equipment that will enhance the thermal performance of the EOR method utilized.

In steam injection, steam pipes carry steam created by steam injection generators at the service level all the way or as close as possible to the oil well reservoir. Preferably, these steam pipes have thermal insulation that helps retain the heat as the steam travels throughout the production line. To do this, steam pipes generally require a vacuum between an inner pipe and an outer layer in contact with the ocean or bed floor, or require a high performance thermal insulation method.

The most common steam pipe technology available in the current market uses archaic vacuum technology. The vacuum is created through mechanical pumps but maintained chemically by "getters". Examples of a vacuum system 100 according to the prior art are shown in FIGS. 1A-1D. The vacuum system 100 includes an outer tube 101 surrounding an inner tube 102, with a steam flow 103 through the inner tube 102. Several getters 104 are provided, which are deposits of reactive material placed inside the vacuum system 100, for the purpose of completing and maintaining the vacuum. The getter 104 may be six by three millimeters in size. When gas molecules strike the getter 104 material, they combine with the getter 104 chemically or by adsorption. Thus, the getter 104 removes small amounts of gas from the evacuated space between the inner tube 102 and outer tube 101. Small amounts of gas within a vacuum insulated panel can greatly compromise its insulation value. Getters 104 help to maintain the vacuum for a limited period of time. After a getter 104 has combined with the gas, a destroyed getter 105 results, which cannot combine with further gas.

There are several disadvantages of vacuum technology steam pipes known according to the art. Hydrogen, which is in water 106, being one of the smallest atoms can penetrate the steam pipe's metal walls and react with the getters 104, causing a partial or complete loss of vacuum. Hydrogen also has a conductivity property higher than that of air. This in turn completely removes the pipe's ability to thermally insulate the steam's heat. Steam and water inside the pipe quickly cool, and the steam turns into liquid water. The liquid water quickly fills the oil well, creating severe operational problems. Thermal pipes then need to be replaced, production stopped, meaning an operational risk is incurred and there is a loss of profit to the oil well operator.

What is needed therefore is an improved, thermally insulating pipe, which avoids the shortcomings in the art.

SUMMARY OF THE INVENTION

The present invention relates to a new and improved thermally insulating pipe and a method for manufacturing the same.

Thermally insulating pipes are provided for high-temperature fluid transportation as well as steam transmission and injection for industrial and EOR applications. These pipes are also lightweight, spoolable, threadable, and caustic and moisture resistant.

To achieve the required insulation (i.e., the R-value) to transport high-temperature fluids (including super heated water) and steam heat over extended distances for EOR purposes, current pipes are thick, heavy, inflexible, expensive (many use vacuum technology as described above) and are supplied in short lengths requiring numerous couplings which add further expense and contribute to heat loss. The present invention creates transmission pipes which are lightweight, caustic resistant, durable, spoolable, transportable, and economic. The pipes according to the invention deliver required R-values at constant working temperatures up to 370° C. (700° F.).

In accordance with a first aspect of the invention, a thermally insulating pipe is provided comprising: a first pipe layer surrounding an inner pipe chamber defining an inner diameter of the thermally insulating pipe configured to allow transport of a substance, a first insulation layer surrounding the first pipe layer configured to thermally insulate the inner pipe chamber, and an outer layer defining an outer diameter of the thermally insulating pipe.

In accordance with a first embodiment of the first aspect of the invention, the thermally insulating pipe comprises a second pipe layer surrounding the first insulation layer. In such an embodiment, the second pipe layer may be surrounded by the outer layer of the insulating pipe. Further in such an embodiment, the second pipe layer may be offset from the first pipe layer by up to 90 degrees.

In accordance with a second embodiment of the first aspect of the invention, the thermally insulating pipe comprises a second pipe layer surrounding the first insulation layer. The thermally insulating pipe may further comprise a second insulation layer surrounding the second pipe layer; and a third pipe layer surrounding the second insulation layer. In such an embodiment, the third pipe layer may be surrounded by the outer layer of the insulating pipe. Further in such an embodiment, the second pipe layer may be offset from the first pipe layer by up to 90 degrees, and/or the third pipe layer may be offset from the second pipe layer by up to 90 degrees.

Further in accordance with the first aspect of the invention, including either or both of the aforementioned first or second embodiments of the first aspect of the invention, the first pipe layer, second pipe layer, third pipe layer and/or outer layer, as provided in the thermally insulating pipe, can be made from a composite fiber material impregnated with an epoxy resin.

Further in accordance with the first aspect of the invention, including either or both of the aforementioned first or second embodiments of the first aspect of the invention, the outer layer may have a greater thickness than each of the first pipe layer, second pipe layer and/or third pipe layer, as provided in the thermally insulating pipe.

Further in accordance with the first aspect of the invention, including either or both of the aforementioned first or second embodiments of the first aspect of the invention, the first insulation layer and/or second insulation layer, as provided in the thermally insulating pipe, are formed from a non-woven or woven material insulating material combined with an epoxy resin.

Further in accordance with the first aspect of the invention, including either or both of the aforementioned first or second embodiments of the first aspect of the invention, the thermally insulating pipe is configured to transport steam to an oil reservoir to supply heat to oil in the oil reservoir.

Further in accordance with the first aspect of the invention, including either or both of the aforementioned first or second embodiments of the first aspect of the invention, the thermally insulating pipe is configured to transport a heated liquid to an oil reservoir to supply heat to oil in the oil reservoir.

Further in accordance with the first aspect of the invention, including either or both of the aforementioned first or second embodiments of the first aspect of the invention, the outer layer of the thermally insulating pipe is threaded.

According to a second aspect of the invention, a method for creating a thermally insulating pipe is provided. The method may comprise forming a first pipe layer defining an inner pipe chamber defining an inner diameter of the thermally insulating pipe configured to allow transport of a substance, forming a first insulation layer around the first pipe layer configured to thermally insulate the inner pipe chamber, and forming an outer pipe layer defining an outer diameter of the thermally insulating pipe.

In accordance with a further embodiment of the method of the second aspect of the invention, forming the first pipe layer may comprise spinning, weaving, braiding or knitting a fiber thread coated with an epoxy resin into a pipe shape, and wherein forming the first insulation layer comprises wrapping an insulating material around the first pipe layer.

In accordance with any or all of the above-referenced embodiments of the method of the second aspect of the invention, the first pipe layer may be formed around a mandrel.

In accordance with any or all of the above-referenced embodiments of the method of the second aspect of the invention, the method may further comprise forming a second pipe layer around the first insulation layer.

In accordance with any or all of the above-referenced embodiments of the method of the second aspect of the invention, forming the outer layer of the insulating pipe may comprise spinning, weaving, braiding or knitting a fiber thread coated with an epoxy resin around the second pipe layer.

In accordance with any or all of the above-referenced embodiments of the method of the second aspect of the invention, a further embodiment of the method may further comprise forming a second insulation layer around the second pipe layer; and forming a third pipe layer around the second insulation layer. The outer layer of the insulating pipe may be formed around the third pipe layer. Additionally or alternatively, forming the second and third pipe layers may comprise spinning, weaving, braiding or knitting a fiber thread coated with an epoxy resin around the first and second insulation layers, respectively, and forming the second insulation layer may comprises wrapping an insulating material around the second pipe layer. Additionally or alternatively, the number of pipe layers and insulating layers in the thermally insulating pipe can be increased by repeating the steps of forming a pipe layer around an insulation layer and forming an insulation layer around a pipe layer until a particular number of layers is reached.

BRIEF DESCRIPTION OF THE FIGURES

FIG. 2B shows a cross-sectional view of thermally insulating pipe, in accordance with the first embodiment of the invention.

FIG. 3A shows a thermally insulating pipe, in accordance with a second embodiment of the invention.

DETAILED DESCRIPTION OF THE FIGURES

In accordance with the present invention, thermally insulating pipes are provided, which are shown and described with reference made to FIGS. 2A-5. The insulating pipes of the present invention can be used to extract geothermal energy for power generation and for other EOR applications, including for example, high-temperature fluid transportation (including super-heated water), steam transmission and injection for industrial and EOR applications. The insulating pipes are configured to transport heated contents and to minimize the loss of heat from the heated contents during transport. This maximizes the delivery of heat from the heated contents to the end location of the insulating pipes.

Figure 1B:
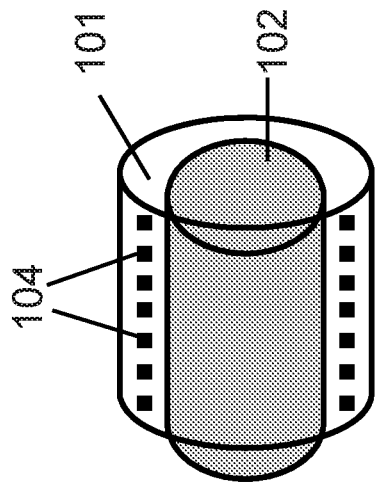
FIGS. 1A-1D show pipes implementing vacuum technology according to the prior art.
Figure 1A:
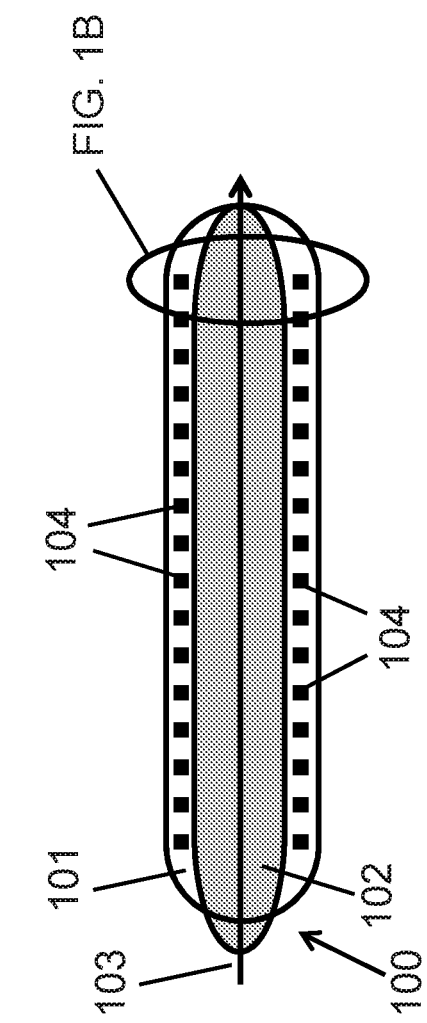
Figure 1D:
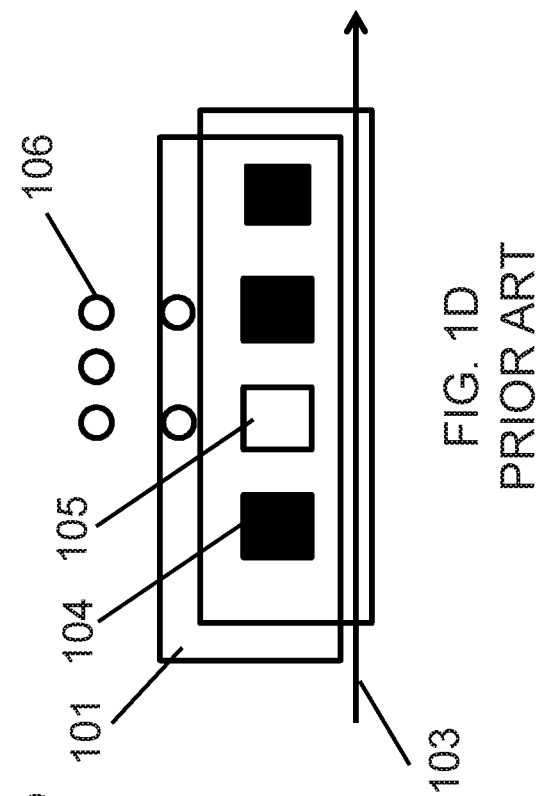
Figure 1C:
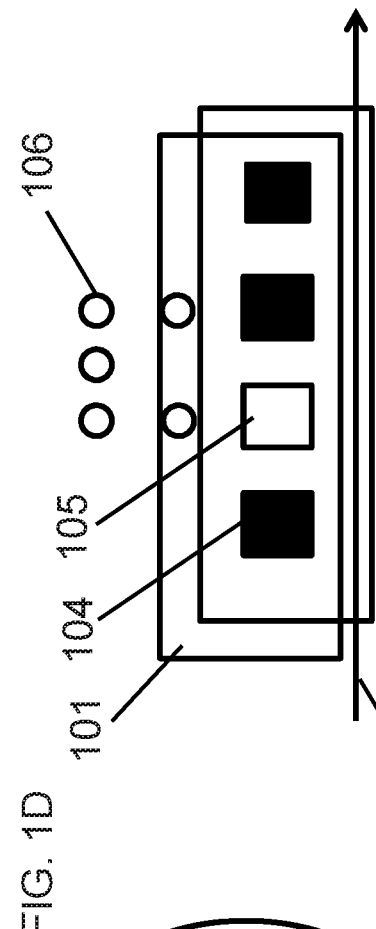
Figure 2A:
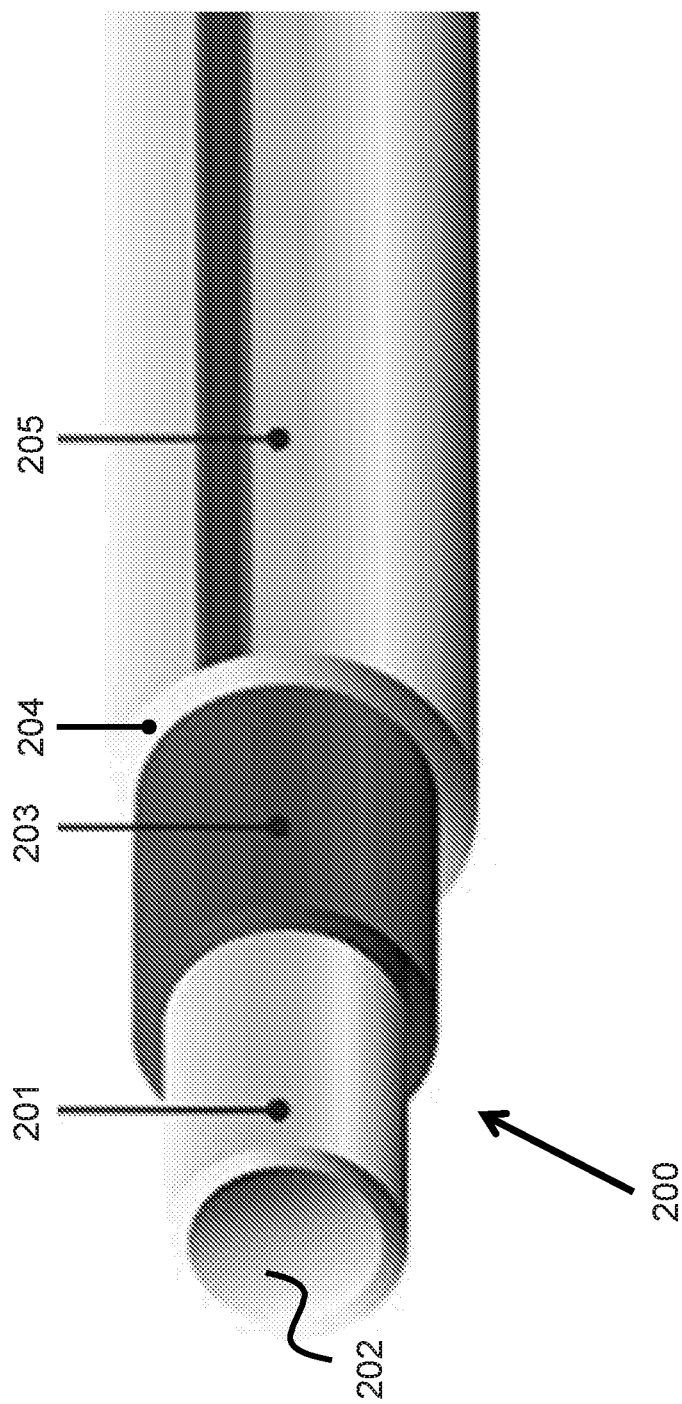
FIG. 2A shows a thermally insulating pipe, in accordance with a first embodiment of the invention.

In a first embodiment of the invention shown in FIGS. 2A and 2B, an insulating pipe 200 is provided. The insulating pipe 200 includes a first pipe layer 201 positioned in the center of the insulating pipe 200. The first pipe layer 201 surrounds an inner chamber 202 of the insulating pipe 200. The contents of the insulating pipe 200, such as a fluid or steam, travel through the inner chamber 202 along the length of the insulating pipe 200. In certain embodiments, the inner chamber 202 of the insulating pipe 200 may have a diameter of 2.75 inches, which corresponds to the inner diameter of the insulating pipe 200. The inner diameter may vary in other embodiments. The first pipe layer 201 can be formed from a fiber reinforced composite material impregnated with an epoxy resin, and may have a thickness of one-eighth of an inch.

An insulation layer 203 is provided around the first pipe layer 201. The insulation layer 203 can be made from a resin-saturated and non-woven or woven material, including for example, glass, mineral fibers such as basalt, and silica aerogels, which may be in the form of a non-woven mat. In the embodiment of FIGS. 2A and 2B, the thickness of the insulation layer 203 may be one-quarter of an inch. A second pipe layer 204 is provided, surrounding the insulation layer 203. The second pipe layer 204 may be formed of the same or similar fiber composite materials as the first pipe layer 201, and have a similar thickness. However, the second pipe layer 204 is further offset from the first pipe layer 201 by up to 90°. In order to add optimum strength to the insulating pipe 200, layers are wound at opposing angles. For discrete length pipe, the machine may automatically do this as the carriage moves up and down the pipe. In the case of a 90 degree offset, for example, the first layer can be applied with the head of the tape of insulating material pointing to 45 degrees to the right of vertical (relative to the orientation of FIG. 5), and the second layer will be applied with the head of the tape pointing to 45 degrees to the left of vertical (relative to the orientation of FIG. 5). In alternative embodiments, the angles may vary to provide an offset less than 90 degrees. The inclusion of additional pipe layers after the first pipe layer 201 provides additional thermal insulation, and the buildup of the multiple layers provides boundary layers that aid in the development of the thermal properties of the pipe.

An outer pipe layer 205 is provided around the second pipe layer 204. The outer pipe layer 205 can be formed from a fiber reinforced composite material impregnated with an epoxy resin, and may have a thickness of one-quarter of an inch. The outer pipe layer 205 is provided with additional thickness or bulk, so that the insulating pipe 200 can be more easily spliced, threaded or swedged. The outer pipe layer 205 defines the outer diameter of the insulating pipe 200, which in the embodiment discussed herein is approximately 3.5 inches, but may vary in other embodiments.

The pipe layers may vary in terms of both resin and fiber components from layer to layer. Within a pipe, resins used in each layer are preferably from the same family resin for the internal structure of the pipe. However, in other embodiments, less expensive resins may be used for the bulked-up outer layer 205 of the pipe. The fibers used in the layers will be predominantly temperature resistant, such as glass and basalt for the internal structure, but different fibers may be contemplated for the outer layer 205.

The insulating pipe 200 may have an R-Value of up to 40 or greater. The insulating pipe 200 can be spooled and/or threaded, and is environmentally resistant. The size and dimensions of the insulating pipe 200, and each layer, may vary from the dimensions described above, depending on the volume or size requirements for a particular implementation of the insulating pipe 200.

Figure 3B:
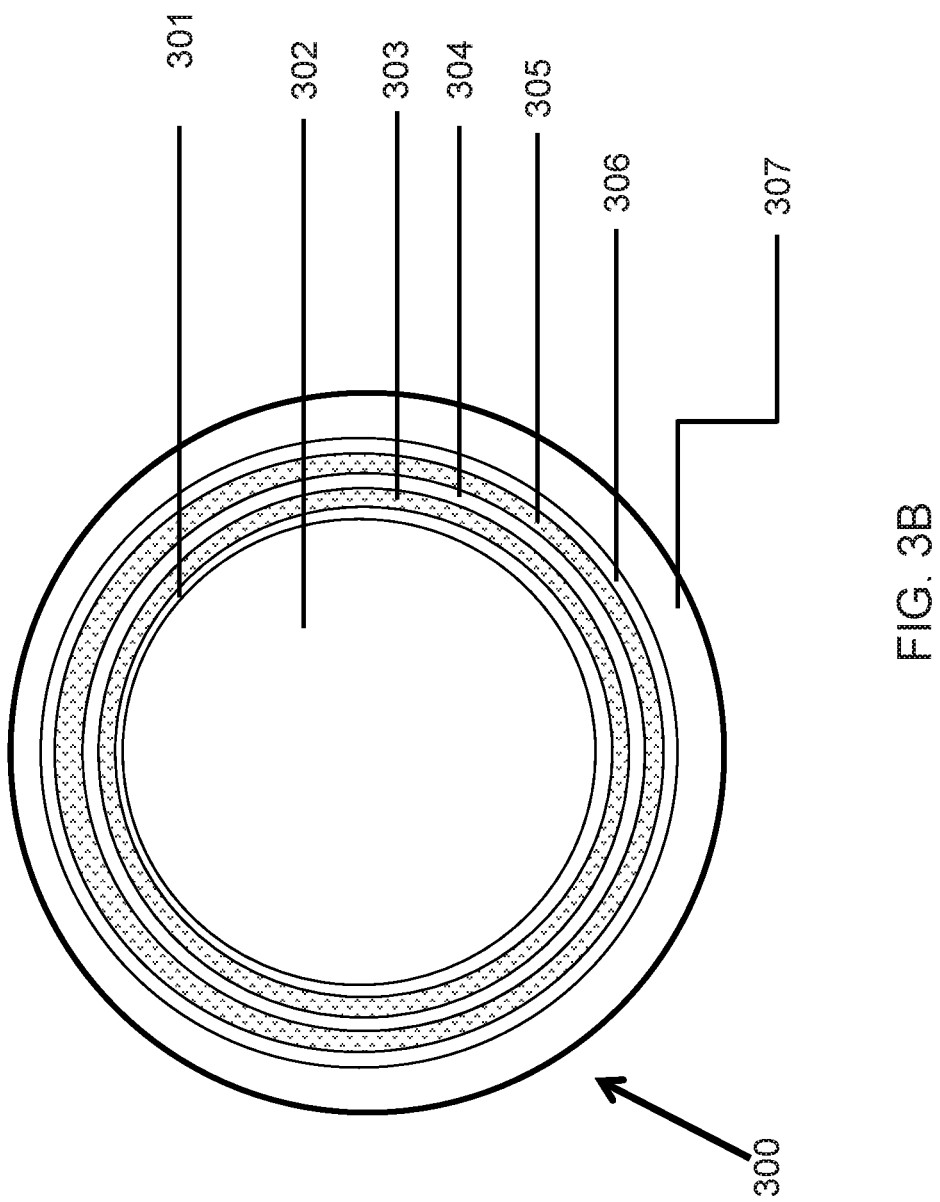
FIG. 3B shows a cross-sectional view of the thermally insulating pipe, in accordance with the second embodiment of the invention.

In a second embodiment of the invention shown in FIGS. 3A and 3B, an alternatively configured insulating pipe 300 is provided. The insulating pipe 300 can be considered a "dual-core" insulating pipe because as compared to the insulating pipe 200 shown in FIGS. 2A and 2B, the insulating pipe 300 includes an additional pipe layer and insulation layer.

The insulating pipe 300 includes a first pipe layer 301 positioned in the center of the insulating pipe 300. The first pipe layer 301 surrounds an inner chamber 302 of the insulating pipe 300. The contents of the insulating pipe 300, such as a fluid or steam, travel through the inner chamber 302 along the length of the insulating pipe 300. In certain embodiments, the inner chamber 302 of the insulating pipe 300 may have a diameter of 2.75 inches, which corresponds to the inner diameter of the insulating pipe 200. The inner diameter may vary in other embodiments. The first pipe layer 301 can be formed from a fiber reinforced composite material impregnated with an epoxy resin, and may have a thickness of one-eighth of an inch.

A first insulation layer 303 is provided around the first pipe layer 301. The first insulation layer 303 can be made from a resin-saturated and non-woven or woven material. In the embodiment of FIGS. 3A and 3B, the thickness of the first insulation layer 303 may be one-quarter of an inch. A second pipe layer 304 is provided, surrounding the first insulation layer 303. The second pipe layer 304 may be formed of the same or similar fiber composite materials as the first pipe layer 301, and have a similar thickness. However, the second pipe layer 304 is further offset from the first pipe layer 301 by up to 90°. A second insulation layer 305 is provided around the second pipe layer 304. The second insulation layer 305 can be made from a resin-saturated and non-woven or woven material similar to the first insulation layer 303. The thickness of the second insulation layer 305 may be one-quarter of an inch. A third pipe layer 306 is provided, surrounding the second insulation layer 305. The third pipe layer 306 may be formed of the same or similar fiber composite materials as the first pipe layer 301 and second pipe layer 304, and have a similar thickness. However, the third pipe layer 306 is further offset from the second pipe layer 304 by up to 90°.

An outer pipe layer 307 is provided around the third pipe layer 306. The outer pipe layer 307 can be formed from a fiber reinforced composite material impregnated with an epoxy resin, and may have a thickness of one-quarter of an inch. The outer pipe layer 307 is provided with additional thickness or bulk, so that it can be more easily spliced, threaded or swedged. The outer pipe layer 307 defines the outer diameter of the insulating pipe 300, which in the embodiment discussed herein is approximately 3.875 inches, but may vary in other embodiments.

The insulating pipe 300 can be spooled and/or threaded, and is environmentally resistant. The size and dimensions of the insulating pipe 300, and each layer, may vary from the dimensions described above, depending on the volume or size requirements for a particular implementation of the insulating pipe 300.

In accordance with further embodiments of the present invention, the insulating pipes may have additional pipe and insulation layers beyond the number of layers shown in FIGS. 3A-3B can be provided. Additionally, the insulating pipes may have dimensions that differ from the examples provided above, without departing from the scope of the invention. For example, in a further embodiment of a large volume insulating pipe, the pipe may have an inner diameter of 3.875 inches, surrounded by a first pipe layer having a thickness of ⅛ inch, surrounded by a first insulation layer having a thickness of ⅞ inch, surrounded by a second insulation layer having a thickness of ⅛ inch, surrounded by a second insulation layer having a thickness of ¾ inch, surrounded by an outer layer having a thickness of ¼ inch, providing a pipe with an outer diameter of six inches.

According to exemplary methods for creating the thermally insulating pipes according to the invention, the pipe layer of the insulating pipe is made from fibrous thread and is saturated with an epoxy resin, as previously described. A fiber thread is used that may be grooved or cut, which allows epoxy adhesive, which can be made primarily of similar material as the thread, to reside internally in the threads to mechanically and chemically bond the joint between fiber threads. The possible fiber base materials include basalt, stainless steel, steel, iron, aluminum, carbon fiber, polytetrafluorethylene (PTFE), polypropylene (PP), polyethylene (PE), silica aerogels, fiberglass such as E-glass and S-2 glass and urethane. The fiber material allows multiple processing and design formats for combining with the epoxy resin, including spray, transfer molding, soaking or encapsulation to ensure complete adherence and strength created by the use of the base material.

An epoxy resin is used to encapsulate or saturate the woven, non-woven or blended materials and creates a material capable of withstanding high temperatures and pressures, which outperforms prior art materials. The epoxy resin may consist of 25-75% (by volume) polyamides, 5-25% (by volume) bismaleimides and 2-7% (by volume) cyanate esters. Filler materials can also be included in the volume of the epoxy resin. By mixing these components and adding additive materials, and then treating fiber with the resulting combination, variable product characteristics can be achieved. By adjusting the additives, the product characteristics change. An advantage of the epoxy resin is its high heat capability and the ability to change the heat and electrical insulation ability or conductivity of the woven or spun products, while maintaining the tensile strength of the fiber used.

Additives, such as in the form of fine spheres and/or powdered material, can be mixed with the epoxy base materials to adjust the epoxy resin to the required product specifications. The additives listed in Table 1 can be used with the epoxy resin to adjust the product characteristics required, and can be used with any of the aforementioned fiber base materials.

TABLE 1

Additives and Respective Primary Impact

| Additive | Impact |
| --- | --- |
| Phenolics micrometer spheres) | Insulation (Thermal & Electric) Filler |
| Benzoxazines | Low conductivity - Increase adhesiveness |
| Xeon gas | Allows low temperature |
| Molybdenum disilicide (coating) | Reduce cost/friction |
| Boron nitride (coating) | Reduce cost/friction |
| Methyl | Cure time |
| Cyanoacrylate | Cure time |

The epoxy resin base materials and additives are mixed under a process that controls the production of a strong epoxy bond to the chosen fiber. In one embodiment, the epoxy resin can be sprayed on the mantle of an extrusion or spinning pipe machine or weaving machine, and in doing so, the epoxy resin can be mixed and adjusted with additives of to achieve the planned product specifications. As previously described, the epoxy resin can also be applied to the fiber thread using other methods.

An important condition that must be met is the adhesion of the spheres that conduct or reject thermal transfer via the epoxy resin. This is accomplished by using an epoxy formula that controls the makeup of the material to achieve a product that has excellent resistance to moisture, oxidation, alkaline, shock, acid and solvent. Full encapsulation is accomplished by adding or reducing plasticizers formulated in the epoxy resin.

For high-speed coatings, an epoxy formula of methyl-based or cyanoacrylate-modified additives may be used to adjust the cure time of the product. Each of the coatings positively affects the barcol hardness and fluid dynamics of the surface conditions on the material. Coatings may be applied internally and/or externally to the surface during production. The additives combined with epoxy resin can create adhesion and eliminate the potential of dry lamination between the epoxy and the fabric.

Standard temperature capability ranges may be accomplished, ranging from 250° C. to 700° C. The temperature capability of a planned pipe can be achieved by parametric entry of data that will instruct the machine manufacturing the material how to control the mixing and application of additives and coatings. The machinery used for creating the pipe material is provided with sensors that verify the adjustments required for each mix and use of the epoxy resin. These sensors may be placed at the extruding location and the form controlling section of the machinery.

Extreme temperature requirements for the finished pipe material may result in an adjustment in the epoxy resin formula, causing some additives to be titanium carbide-based, which will allow for the capacity to reach extreme high temperatures and extreme pressures. Temperature resistances may be reached as high as 2800° F. and can be adjusted to match the requirements of the application.

Sensors, including X-ray and spectral analysis, can determine the chemical reaction within the interchange of the epoxy, the additives and the coatings applied during extrusion. Viscous flow and crystallization may be determined during sample or pilot production once the data has been entered and the epoxy formula is adjusted. Distortion of the crystallization alignment and its orientation are verified and tested during this inspection.

The methods of the present invention for creation of the epoxy resin with additives allows for the adjustment and control of the flexibility, the modular strength, the sheer, the tensile stress capacities and the complete control of the exposure to high temperature or temperature variances.

Esther linkages may be adjusted by material augmentation to create post-cure relaxation of the combination of epoxy resin and fiber formed in the shape of a round pipe or woven fabric. Off-gas and post-cure time are dependent upon the formula and catalyst of the epoxy resin.

The epoxy resin uses standard, known high temperature materials with the addition of thermal adjustable, encapsulated, coatings and bonded shapes that allow fiber and connectivity to work toward a superior energy output. Cost and existing conditions may be applied to each extrusion.

The thickness, weight and modulus density of the epoxy resin may be reduced to less than the comparative alternative materials. This epoxy fabric material will be adjustable to depth pressure gradients as seen in field applications. The transfer of heat specifically may be customized and tuned to match the requirements and output unit to generate energy.

Coatings of the epoxy resin that are applied to the material post-cure may be derived of boron nitride or molybdenum disilicide, capable of withstanding temperatures well over 1000° C. to 1200° C. The coating can reduce production cost and reduce friction inside of a pipe or material surface, and be impregnated directly into the epoxy and fabric.

Using the epoxy resin with fillers and additives to create thermal and electric insulation or conductivity, the result can be designed and changed dynamically by varying the percentages of the additives used to create the epoxy. Designed filler materials can be added that will not weaken the composite but add to the variability of the result. Filler materials can be included with the epoxy resin particularly where the cost of the epoxy resin used is high, to reduce the amount of epoxy resin required. Use of the materials and the additives will control mixing, hardening and surface conditioning that will allow for the adjustment to create custom pipes or material weaves to meet each environmental condition and location required for a product.

As the fibrous material is created, different sections of the material can be treated with different epoxy resins mixed with different additives. As a result, the properties of the material can be varied along the length or surface area of the material. For example, different sections of pipe can be configured to have different levels of thermal insulation. Epoxy resin ingredients and formula may be blended to thermally adjust to temperature retention or temperature conductivity.

The machinery for creating the pipe structure from the material in accordance with the invention may include a rotating mandrel, plate, beams and may also include an inspection station. Such a machine supports filament placement at varying axes and rotations around the spinning mandrel.

Before spinning or weaving a filament, the filament may be preconditioned and saturated through a bath of epoxy resin formulated with two parts to activate its cure time. As the filament approaches the mandrel or the weaving point, injection ports may be provided to inject or spray thermally insulating (or conductive) spheres or powdered materials. Inspection and visual control may be fed back to one or more control systems to control the buildup thickness, strength, elasticity, and size as the pipe or fabric is manufactured. This process is continuous or runs for as long as the materials are provided. The control systems can be programmed to accept and adopt multiple choices of thermally insulating (or conductive) material.

According to the present invention, a continuous supply of filament, which can be spooled by a creel of materials chosen by the consumer specifically for an applicable use and site. Before the continuous filament is wound around the mandrel or used for weaving, there are various options for epoxy and filler for attachment to the filament. Full inspection may be conducted through visual sensors, spectral sensors, off gas sensors and other hyper spectral detection methods. The machine process and sensor process controls the hardening and coating to ensure the correct ground insertion and flow characteristics. The control may provide that no harmful off gases are created during the manufacturing process.

The pipes made from the fiber material can be continuously formed at their full, desired length during the time of use. Pipes can be manufactured at fixed lengths and seamed, bonded or welded as one. Pressure variances will not affect the splicing or lamination to create the extreme length required of these pipes. The pipes can also be manufactured in the field to create seamless installations. Pre-woven, braided or spun fabric pipes or material can be spooled and shipped prior to application of the epoxy resin, and the pipe or material manufacturing can be completed on-site. Similarly, spooled threads of fibrous material can be provided for use in manufacturing the pipe or material on-site.

Wrap angles are variable on such machines, and allow for adjustment of strength in coordination with pressure and strength requirements. Filament density enhances the wrap angle to accomplish additional strengths.

Machinery required to create the pipes from its woven material may be small and portable. Such portable manufacturing machines can be moved to a jobsite so the logistic cost of production can be greatly reduced. Such production machines will have elongation, insulating or conductive properties, high specific strengths and elastic energy absorption. Pressure resistance may be created by modification within the program of such a machine.

Because epoxy resin is embedded in the fabric, machined threading may be applied so as to enable splicing if necessary. These machined ends can be accomplished on the machine to the API 5B standard. In this way, breakage and failure will be at a minimal. Inspection may be maintained during the construction of pipe or other of any form of application to ensure quality.

Use of fillers and additives to create thermal insulation can be designed and changed dynamically during the manufacturing process. Fillers of materials can be added that will not weaken the composite, but add to the variability of the result. Use of materials and their additives that will control mixing, hardening and surface conditioning will allow for the adjustment to create custom pipe or material weave to meet each environmental condition and location.

Figure 4:
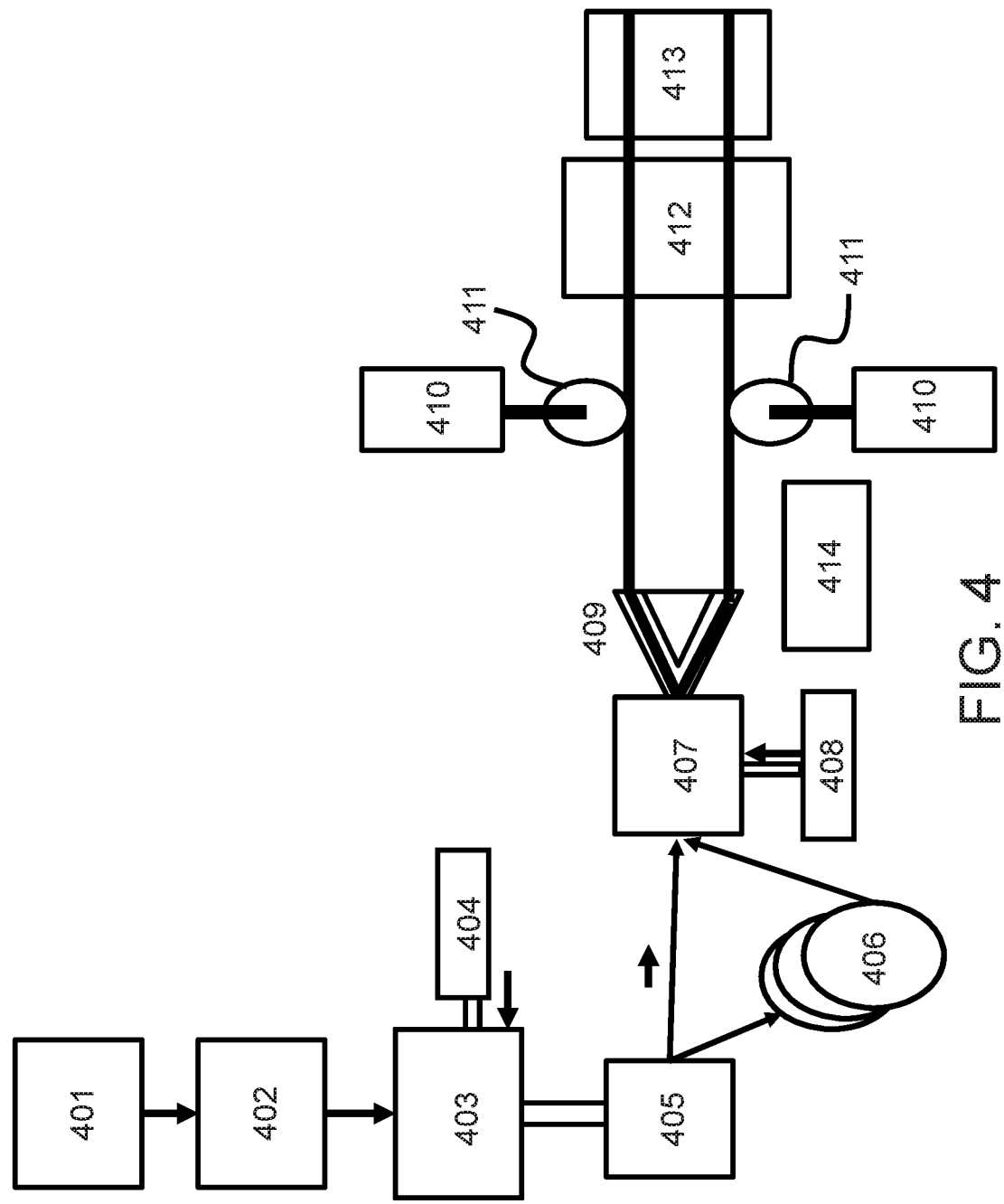
FIG. 4 shows a method and system for manufacturing a pipe in accordance with an embodiment of the invention.

FIG. 4 shows a method according to the invention for manufacturing a pipe formed of a fiber and resin composite material according to the invention.

In step 401, the initial fiber material is collected and provided to the manufacturing machinery. In a preferred embodiment, the initial fiber material can be E-glass. Other materials may be used in further embodiments, such as basalt, stainless steel, steel, iron, aluminum, carbon fiber, polytetrafluorethylene (PTFE), polypropylene (PP), polyethylene (PE), silica aerogels, fiberglass such as E-glass and S-2 glass and urethane. In step 402, the material is crushed by a crusher and treated. The crushed and treated material is then provided to a centrifuge, where it is spun and heated in step 403. While the material is being spun in the centrifuge, any additive materials that are to be included in order to alter one or more properties of the final product as described previously can be added in step 404. After the fiber material is spun and heated in step 403, in step 405, a thread die forms the fiber into a thread. Prior to beginning the pipe formation process, the fiber thread can be spooled in step 406. Alternatively, the fiber thread can be fed directly into the pipe spinning, weaving, braiding or knitting process.

In step 407, the thread is formed into a pipe. The thread can be knit, braided, woven or spun into a number of patterns as previously described, including plain, satin, twill, crowfoot, flat, biaxial or tri-axial. The diameter of the pipe is dependent on the changeable mandrel (409). A different mandrel is used for different pipe sizes. In step 408, the epoxy resin and additives can be supplied as previously described herein, to saturate the thread while it is being spun, braided or woven. The epoxy resin can be applied to the fiber threads while the pipe is being woven, spun or braided, such as by coating the mandrel, or applied after the pipe is formed. The epoxy resin may also be mixed with one or more additives and applied to the thread. Further, one or more additives can be applied to the fiber thread prior to pipe formation.

The completed and uncured pipe, if necessary, can now be shaped. A hydraulic press produces force 410 against the rollers that shape the pipe. In step 411, rollers may be used to apply force to shape the soft pipe. The shape of the pipe may vary depending on the number of rollers utilized. Two rollers create an oblong shape, three rollers create a triangular shape and four rollers create a rectangular shape. After the shaping of the pipe, curing and coating of the pipe and potential sensor insertion occurs in step 412. Coatings can enhance the features of the pipes. Sensor insertion can create a product that can report back information during operating conditions while the pipe is in use. Curing can vary depending on the composition of the pipe which could include ultraviolet treatment, heat treatment or other methods of curing. In step 413, the pipe can be cut into the appropriate lengths. Cutting does not need to occur in certain instances; such as if the pipe created is for laying continuous pipe with a portable fabrication unit.

A control system 414 monitors and controls all the steps in the fabrication process. The control system 414 accepts control input (parameters) for the timing and control of all events. The control system 414 may comprise a non-transitory computer readable medium stored with a computer program and a processor configured to cause the execution of the program, which specifies the buildup construction of each and every product. The program can vary the fiber, the epoxy, the catalysts and open time as well as thermal condition specifically located on each and every product. The control system 414 can be configured to thin, thicken and change weave orientation dynamically per entered parametric values to create strength, flexibility and thermal characteristics; monitor temperature, density and refresh rates for quality control; be parametrically controlled for external input to build pipe and/or material to exact performance requirements; match flow rate to maintain thermal range, tension of surrounding materials, corrosive resistance and other properties to insure product stability; compensate for angle, depth and longevity via surface tension; allow for dynamic shape adjustments to allow for product variability; allow for a unique die design during manufacturing of the material for product shaping; allow for variable curing techniques such as ultraviolet, heat and chemical treatment; allow for coating of one or both sides of the pipe layer for additional performance features; allows for designed pushing or insertion pressure at the mandrel to control and balance the process to eliminate any damage; allow for the cutting or continuous fabrication depending on requirements; allow for product use immediately after fabrication with an initial cure period of, for example, twenty-four hours and permanent curing after, for example, seven days; and allow for pultruding or extruding at high feed rate.

Figure 5:
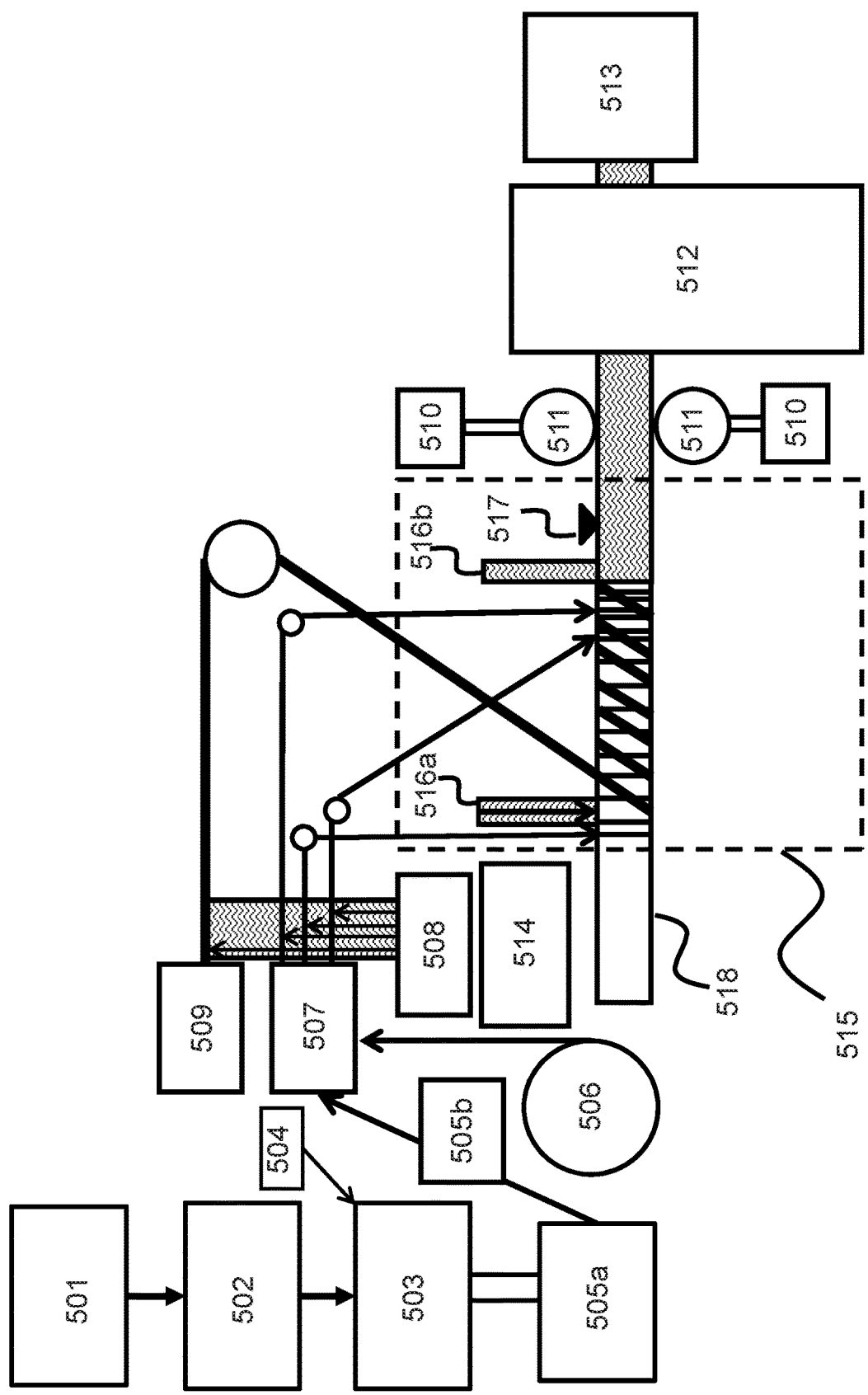
FIG. 5 shows a method and system for manufacturing an insulating pipe, in accordance with an embodiment of the invention.

FIG. 5 shows a further method according to the invention for manufacturing the insulating pipes according to the invention. This method can be used for providing an insulating pipe with multiple layers of fiber composite and insulation, such as the insulating pipes 200 and 300 shown in FIGS. 2A-3B, by performing the steps in the dashed area 515 of FIG. 5 on a pipe, and then repeating the steps in the dashed area on top of the same pipe with the first layers of pipe and insulation having already been added to the pipe.

The initial fiber material 501 is collected and provided to the manufacturing machinery. In a preferred embodiment, the initial fiber material 501 can be E-glass. Other materials may be used in further embodiments, such as basalt, stainless steel, steel, iron, aluminum, carbon fiber, polytetrafluoroethylene (PTFE), polypropylene (PP), polyethylene (PE), silica aerogels, fiberglass such as E-glass and S-2 glass and urethane. The fiber material 501 is crushed by a power crusher 502 and treated. The crushed and treated material is then provided to a centrifuge 503, where it is spun and heated. While the material is being spun in the centrifuge 503, any additive materials 504 that are to be included in order to alter one or more properties of the final pipe as described previously can be added. After the fiber material is spun and heated, a thread die 505a forms the fiber into a thread 507. The thread 507 for forming the pipe can be supplied from the thread die 505a by a direct feed 505b, or prior to beginning the pipe formation process, the fiber thread 507 can be also be provided by a spool 506.

After providing the fiber thread 507 supply, the formation of the pipe begins. The fiber thread 507 is spun into a pipe layer. The pipe layer may alternatively be formed by weaving, knitting or braiding the thread 507. In accordance with an embodiment of the invention, a mandrel 518 can be provided for assisting in the pipe layer formation, by providing a structure for the thread 507 to be spun around. The diameter of the mandrel 518 may determine the inner diameter of the insulating pipe. As the thread 507 is being supplied for the pipe layer formation, epoxy resin and/or additive materials 508 can be supplied to coat the thread 507. Additionally, one or more epoxy/additive mops 516a, 516b can be provided to apply epoxy resin and/or additive materials to the pipe while it is being spun into the pipe shape or after. The application of additional epoxy applied through mops 516a, 516b or brushes is to ensure full "wet out" of the thicker woven and non-woven materials, as well as to provide a carrier for additional additives, including for the augmentation of thermal insulation properties which give the pipe layer its required performance characteristics. A doctor blade 517 may also be provided to control excess epoxy by "scraping" the surface of the pipe in a manner that does not compromise the integrity of the weave and at the same time creates a point at which excess epoxy can be efficiently captured to allow the recycling of excess epoxy, thereby reducing process costs. The pipe layer formation may continue until the layer has the desired thickness. For example, in the insulating pipes 200 and 300 shown in FIGS. 2A-3B, the inner pipe layers 201, 301 have a thickness of one-eighth of an inch.

After completion of the pipe layer, an insulation layer can be formed around the pipe layer. A supply of woven or non-woven fiber tape 509 is provided for the insulation layer(s), which is spun around the pipe layer. The tape 509 is a material capable of providing a high degree of thermal insulation. As the tape 509 is being supplied for the pipe layer formation, epoxy resin and/or additive materials 508 can be supplied to coat the tape 509. Additionally, one or more epoxy/additive mops 516a, 516b can be provided to apply epoxy resin and/or additive materials to the tape while it is being spun around the pipe or after. The insulation layer formation may continue until the layer has the desired thickness. For example, in the insulating pipes 200 and 300 shown in FIGS. 2A-3B, the innermost insulation layers 203, 303 have a thickness of one-quarter of an inch.

After the insulation layer is formed, an additional pipe layer can be provided around the insulation layer, in accordance with the same process used for creating the first insulation layer.

In the pipe manufacturing process, a production station 515 may be provided, which allows for the application of an insulation layer followed by the application of a pipe layer, in a sequence that can be repeated. The production station 515 may be repeated multiple times in whole or in part along the length of the production line to custom manufacture the pipe. For example, in manufacturing the insulating pipe 200 shown in FIGS. 2A and 2B, the pipe is formed by providing a first pipe layer 201, followed by an insulating layer 203, followed by a second pipe layer 204. In manufacturing the insulating pipe 300 shown in FIGS. 3A and 3B, the production station 515 is repeated to provide an additional insulation layer 305 and an additional pipe layer 306, on top of the first pipe layer 301, insulating layer 303 and second pipe layer 304. This process can be repeated to provide multiple layers of insulation and/or pipe.

An outermost layer of fiber can be formed over the final pipe layer. The outermost layer can be formed having a greater thickness than the pipe layers in order to allow the pipe to be spliced, threaded or swedged, as previously described in reference to the outer pipe layer 205 shown in FIGS. 2A and 2B, and the outer pipe layer 307 shown in FIGS. 3A and 3B. In alternative embodiments, the outermost pipe layer around having an increased thickness can be directly formed on top of the outermost insulation layer.

The completed and uncured pipe, if necessary, can now be shaped. A hydraulic press 510 produces force against the rollers 511 that shape the pipe. The rollers 511 may be used to apply force to shape the pipe. The shape of the pipe may vary depending on the number of rollers 511 utilized. After the shaping of the pipe, curing and coating of the pipe and potential sensor insertion 512 occurs. Coatings can enhance the features of the pipes. Sensor insertion can create a product that can report back information during operating conditions while the pipe is in use. Curing can vary depending on the composition of the pipe which could include ultraviolet treatment, heat treatment or other methods of curing. The pipe can be cut 513 into the appropriate lengths. Cutting does not need to occur in certain instances; such as if the pipe created is for laying continuous pipe with a portable fabrication unit.

A control system 514 monitors and controls all the steps in the fabrication process. The control system 514 accepts control input (parameters) for the timing and control of all events. The control system 514 may comprise a non-transitory computer readable medium stored with a computer program and a processor configured to cause the execution of the program, which specifies the buildup construction of each and every product. The program can vary the fiber, the epoxy, the catalysts and open time as well as thermal condition specifically located on each and every product.

Projected key performance attributes of the insulating pipes of the present invention include improvements to: strength, weight, thermal non-conductivity, caustic/chemical resistance, moisture resistance, fire resistance, and stress corrosion resistance. Projected performance advantages of the insulating pipes of the present invention include: high strength (comparable or superior to materials such as carbon fiber, steel and Kevlar), light weight (comparable with carbon fiber), elasticity, ductile behavior, high elongation, elastic energy absorption, adaptability, flow control and low cost.

Despite their low relative weight, the fiber composite materials used in the production of the thermally insulating pipes described herein are designed to meet or exceed the tensile strength of the competitive materials. The composite materials used in the present invention may have a density of approximately one gram per cubic centimeter, and a lower density than other materials such as, aluminum, titanium, alloy steel and stainless steel. The composite materials used in the present invention may also have a lower weight for a given set of dimensions than other materials. For example, for 4.5 inch outer diameter ("OD") pipe with 0.237 inch wall thickness, the weight per foot of the composite materials can be less than 5 pounds, which is less than the weights for a similarly constructed stainless steel, carbon steel or aluminum pipe. The composite fiber materials used in the invention may also have a lower cost per unit of length than other materials, including stainless steel, carbon steel or aluminum pipe. Relative price advantage extends to formed materials and components with advantages extended where tensile strength is primary attribute versus heat tolerance.

According to the teachings hereof, by using advanced fiber and material concepts to create porous products, such as pipes, there is a significant reduction in the weight and cost of the product, and a significant increase in strength and caustic/abrasion resistance. Table 2 shows a listing of chemicals and temperatures at which the woven material according to the invention did not suffer any attack.

TABLE 2

| Causticity Testing | |
| --- | --- |
| Chemical | Temperature (° C.) |
| Ammonia Liquid | 250 |
| Acetic Acid (Conc.) | 200 |
| Benzene | 100 |
| Brake Fluid | 250 |
| Ethylene Glycol (50% Aq.) | 250 |
| Hydrochloric Acid (12%) | 100 |
| Hydrogen Sulfide (gas) | 250 |
| Hydraulic Fluid | 30 |
| Heavy Aromatic Naphtha (100%) | 250 |
| Jet A Fuel | 30 |
| Methanol | 100 |
| Methane Gas | 250 |
| Petroleum Oil | 100 |
| Sea Water | 250 |
| Sodium Bisulfite (50% Aq.) | 250 |
| Sodium Hydroxide (50%) | 250 |

TABLE 2-continued

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed:

1. A method for creating a thermally insulating pipe about a mandrel, comprising:
    forming a first pipe layer as an innermost layer of the thermally insulating pipe and defining an inner pipe chamber therein defining an inner diameter of the thermally insulating pipe configured to allow transport of a substance, the first pipe layer formed from a fiber thread coated with an epoxy resin;
    forming a first insulation layer around the first pipe layer configured to thermally insulate the inner pipe chamber;
    forming a second pipe layer around the first insulation layer, wherein forming the second pipe layer comprises spinning, weaving, braiding or knitting a fiber thread of the second pipe layer around the first insulation layer at an offset angle from the first pipe layer that is greater than 0° and up to 90°;
    forming a second insulation layer around the second pipe layer, wherein forming the second insulation layer comprises wrapping an insulating material forming the second insulation layer around the second pipe layer;
    forming an outer pipe layer defining an outer diameter of the thermally insulating pipe; and removing the mandrel.

2. The method for creating a thermally insulating pipe according to claim 1, wherein forming the first pipe layer comprises spinning, weaving, braiding or knitting the fiber thread into a pipe shape, and wherein forming the first insulation layer comprises wrapping an insulating material around the first pipe layer.

3. The method for creating a thermally insulating pipe according to claim 1, wherein forming the outer layer of the insulating pipe comprises spinning, weaving, braiding or knitting a further fiber thread coated with a further epoxy resin around the second pipe layer.

4. The method for creating a thermally insulating pipe according to claim 1, further comprising:
    forming a third pipe layer around the second insulation layer.

5. The method for creating a thermally insulating pipe according to claim 4, wherein forming the third pipe layers comprise spinning, weaving, braiding or knitting a further fiber thread coated with a further epoxy resin around the second insulation layer at an offset angle from the first pipe layer that is greater than 0° and up to 90°.

6. The method for creating a thermally insulating pipe according to claim 4, wherein the number of pipe layers and insulating layers in the thermally insulating pipe can be increased by repeating the steps of forming a pipe layer around an insulation layer and forming an insulation layer around a pipe layer until a particular number of layers is reached.

7. The method for creating a thermally insulating pipe according to claim 1, wherein the outer pipe layer is formed from a fibrous material different than the fiber thread of the first pipe layer.

8. The method for creating a thermally insulating pipe according to claim 1, wherein the fiber thread of the first pipe layer is formed from glass, basalt or silica.

9. The method for creating a thermally insulating pipe according to claim 1, wherein the epoxy resin comprises polyam ides, bismaleimides and cyanate esters.

10. The method for creating a thermally insulating pipe according to claim 9, wherein the epoxy resin comprises between 25-75% by volume of the polyam ides, 5-25% by volume of the bismaleim ides and 2-5% by volume of the cyanate esters.

11. The method for creating a thermally insulating pipe according to claim 1, wherein the second pipe layer formed from same the fiber thread coated with the epoxy resin as the first pipe layer.

12. The method for creating a thermally insulating pipe according to claim 2, wherein the epoxy resin is applied to the fiber thread during spinning, weaving, braiding or knitting the fiber thread into the first pipe layer.

13. The method for creating a thermally insulating pipe according to claim 1, wherein the outer pipe layer has a thickness greater than a thickness of the first pipe layer or the second pipe layer.

14. The method for creating a thermally insulating pipe according to claim 1, further comprising, after forming the outer pipe layer, spooling the thermally insulating pipe on a spool.

15. The method for creating a thermally insulating pipe according to claim 1, further comprising, after forming the outer pipe layer, shaping a cross-sectional shape of the thermally insulating pipe via a plurality of rollers.

16. The method for creating a thermally insulating pipe according to claim 15, further comprising, after shaping the cross-sectional shape of the thermally insulating pipe, curing the thermally insulating pipe.

* * * * *